United States Patent [19] [11] 4,036,678
Lambert [45] July 19, 1977

[54] LAP SEAM FOLDER AND WIDE WIDTH SEALER

[76] Inventor: Everette M. Lambert, 3380 Edward Ave., Santa Clara, Calif. 95050

[21] Appl. No.: 570,308

[22] Filed: Apr. 21, 1975

[51] Int. Cl.² .............................................. B65C 1/00
[52] U.S. Cl. ................................... 156/461; 156/202; 156/216; 156/227; 156/467; 156/544
[58] Field of Search .............. 156/443, 461, 463, 465, 156/466, 467, 468, 200–204, 212, 216, 226, 227, 544; 93/35 R

[56] References Cited

U.S. PATENT DOCUMENTS

| | | | |
|---|---|---|---|
| 2,388,770 | 11/1945 | Stein ..................................... | 156/202 |
| 2,820,497 | 1/1958 | Rusch .............................. | 93/35 R X |
| 3,063,889 | 11/1962 | Staff ..................................... | 156/201 |
| 3,065,121 | 11/1962 | Andrews ........................... | 156/544 X |
| 3,577,300 | 5/1971 | Glaze et al. ....................... | 156/443 X |
| 3,850,775 | 11/1974 | Bruneau et al. ..................... | 156/463 |

Primary Examiner—David A. Simmons
Attorney, Agent, or Firm—Townsend and Townsend

[57] ABSTRACT

Apparatus for forming a swimming pool cover or similar article having relatively large transverse dimensions by joining a plurality of elongated pieces of heat sealable material together is disclosed. The apparatus includes a working bed, and means for dispensing first and second pieces of heat sealable material onto the bed so that a marginal portion of the first piece is exposed. The apparatus folds the exposed marginal portion of the first piece over a corresponding marginal portion of the second piece, and the marginal portions are heat sealed together to form a single wider piece of material. The wider piece of material is drawn from the bed and stacked and then returned to the dispensing means for adding another elongate piece to the width of the material, eventually forming a piece of material sufficient to cover the entire pool.

10 Claims, 32 Drawing Figures

FIG_1

FIG_6

FIG_7

FIG_8

FIG_9

FIG_12  FIG_13  FIG_14

FIG_15

FIG_18

FIG_16

FIG_19

FIG_17

FIG_20

FIG_21

FIG_22

FIG_23

FIG_24

FIG_25

FIG_26

FIG_27A

FIG_27E

FIG_27B

FIG_27C

FIG_27D

FIG_28

LAP SEAM FOLDER AND WIDE WIDTH SEALER

BACKGROUND OF THE INVENTION

The present invention relates to apparatus for joining a plurality of elongate pieces of heat sealable material together to form a relatively large swimming pool cover or similar article.

When a swimming pool cover is formed by joining several elongate pieces of material together along an edge thereof, two such pieces are first joined along an edge and then successive pieces are added sequentially along an edge until eventually the entire cover is formed. Such covers are ordinarily formed of vinyl material which is relatively heavy and bulky, and as a result, handling of the cover as it is formed is a difficult process. The construction of a machine whereby such swimming pool covers can be formed mechanically has been a difficult problem. As a result, such covers have ordinarily been formed by using manual labor for handling the material, greatly increasing the cost of manufacturing such covers and rendering them economically unattractive.

Another problem with the swimming pool covers and similar items found in the prior art is that the seams between the elongate pieces of material used to form the cover are relatively weak. Such seams are ordinarily formed by overlying two pieces of elongate material so that their edges are aligned, and heat sealing the pieces together along the aligned edge. When the two pieces are unfolded to form the cover, a sharp 180° turn or crease is required of one of the sheets. The stress caused by this crease can tear the sheet, and can cause it to come apart at the seam. As a result, the pool cover has weak spots at the seams which can cause it to fail prematurely.

SUMMARY OF THE INVENTION

The present invention provides a machine for forming a swimming pool cover or similar article having relatively large transverse dimensions by joining a plurality of elongated pieces of heat sealable material is disclosed. The apparatus of the present invention includes a working bed, and means for dispensing first and second pieces of heat sealable material onto the bed so that a marginal portion of the first piece is exposed. The apparatus folds the exposed marginal portion of the first piece over a corresponding marginal portion of the second piece, and the marginal portions are heat sealed together to form a single wider piece of material. The wider piece of material is drawn from the bed and stacked and then returned to the dispensing means for adding another elongate piece of material, eventually forming the entire pool cover.

The present invention folds the edge of one of the pieces of material over the second piece before sealing the pieces of material together. When the folded edge of the one piece is heat sealed to the other piece, the folded piece can be unfolded to form the flat pool cover. The resulting pool cover has no permanent folds or creases in the material, and the cover thus formed is much stronger than those formed by prior art methods. Furthermore, the apparatus of the present invention provides a unitary machine capable of forming a large article such as a swimming pool cover with a minimum of manual labor, rendering such pool covers economically feasible.

The preferred embodiment of the apparatus for dispensing the material onto the working bed includes two pair of rollers located above a movable set of rollers. When two pieces of elongate material are initially used to form the first part of the pool cover, a roll of each such material is mounted between each pair of rollers so that the end of each piece of material is dispensed between the rollers onto the working bed. When these two pieces of material have been heat sealed to form a part of the pool cover, that part is recycled through the dispensing apparatus on the movable set of rollers. This movable set of rollers are mounted to spaced frame members pivotably attached at the upstream end of the set of rollers and free at the downstream end. The frame members can be moved in concert at their free ends to change the direction of feed of the rollers, thereby controlling the direction at which the part of the pool cover is dispensed onto the bed. Means are provided for sensing the lateral position of this part of the pool cover so that control of the direction of feed of it is accomplished automatically. An additional piece of material is dispensed from one of the pairs of rollers for attachment to the already formed part of the swimming pool cover.

The preferred embodiments of the folding apparatus of the present invention includes a folding member which has an elongate flange which normally underlies the exposed marginal portion of the first piece of material. The elongate flange is moved in a semicircular motion to fold the marginal portion of the first piece of material over the corresponding marginal portion of the second piece. Simultaneously an elongate heat sealing member normally disposed above the working bed is moved downwardly to seal the respective marginal portions of the pieces of material together.

In the preferred embodiment of the present invention, an upwardly inclined conveyor is provided over which the heat sealed and folded material is drawn in increments generally equal to the length of the heat sealing member. A first clamping member is provided adjacent the base of the conveyor and a second clamping member is adapted to move along the conveyor. When the material is to be drawn over the conveyor, the second clamping member is biased downwardly over the material, the first clamping member being disengaged, and the movable clamp is motivated along the platform to draw the material from the bed. After the material has been drawn the preselected length, the first clamp is engaged and the second clamp is disengaged and moved back to its original position.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
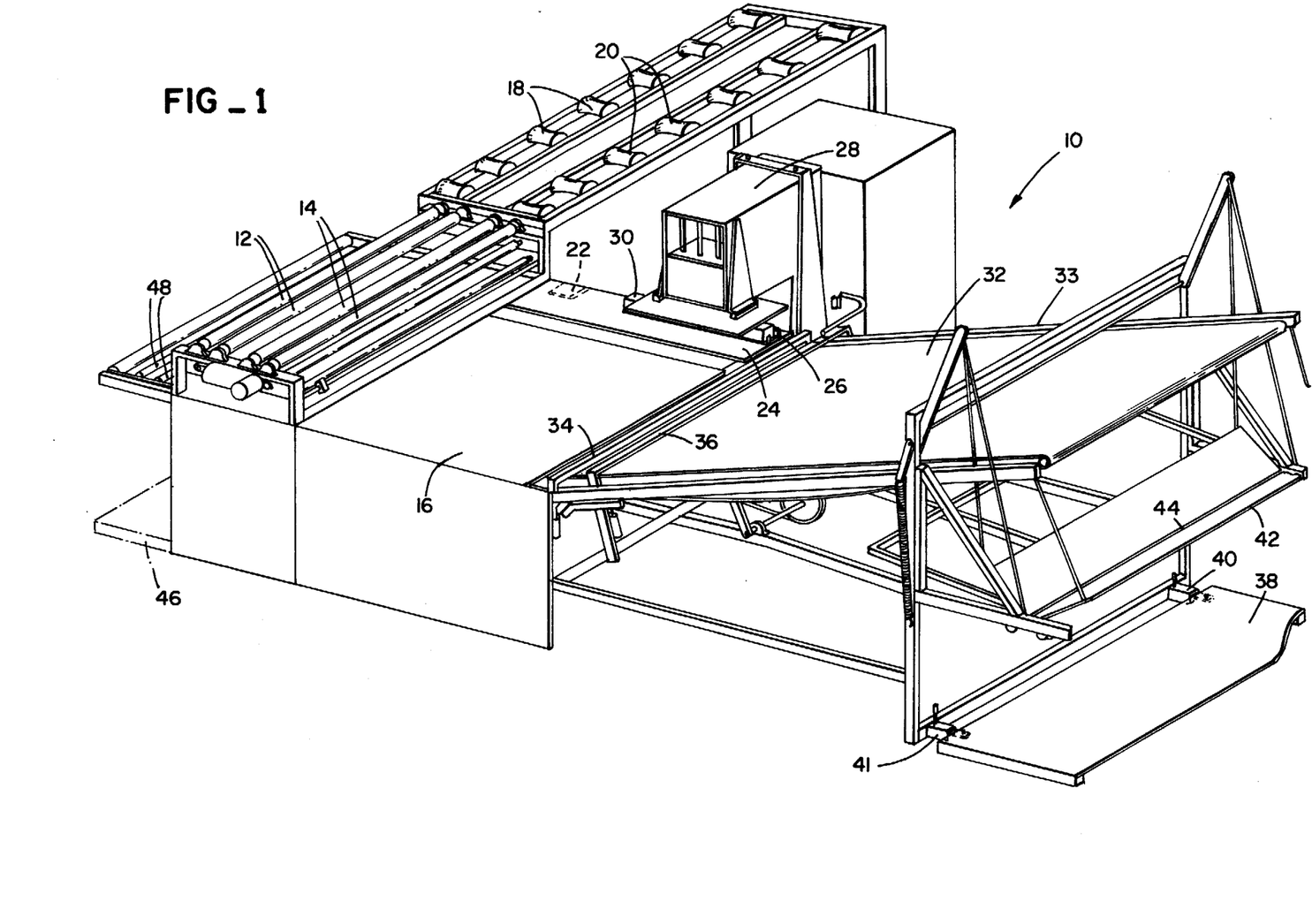
FIG. 1 is a perspective view of the apparatus of the present invention.

The overall construction of the preferred embodiment 10 of the present invention is illustrated by way of reference to FIG. 1. Embodiment 10 can be used to form a swimming pool cover or similar article having wide transverse dimensions. Two sets of parallel rollers 12 and 14 are located at one end of the apparatus and are adapted to support two rolls of elongate heat sealable material (not shown). Rollers 12, 14 are used for dispensing of the material onto a working bed 16 as illustrated in detail hereinafter. A pair of sets of supply rollers 18, 20 can be used for storage of extra rolls of the material for placement on rollers 12, 14 respectively when needed.

As the material is dispensed onto working bed 16, the underlying piece of material is offset from the other piece so that a marginal portion thereof is exposed, as will be illustrated in detail hereinafter. A sensing mechanism 22 is located along one lateral edge of bed 16 to sense the location of this marginal portion and align it with the adjacent lateral edge of the working bed. A plate 24 overlying bed 16 separates the two pieces of material, and a folding mechanism 26 laps the exposed marginal portion of the underlying piece of material over a corresponding marginal portion of the other piece. Heat sealing apparatus 28 is provided having a depending heat sealing member 30 parallel with the adjacent lateral edge of working bed 16 which descends over the folded marginal portions of the pieces of material to heat seal them together.

An outfeed mechanism 31 is provided which includes an inclined conveyor 32. A first clamping member 34 is located at the lower end of conveyor 32, and a second clamping member 36 is movable along the conveyor. As will be illustrated in more detail hereinafter, clamping members 34, 36 act in combination to draw the pieces of material after they have been heat sealed together off working bed 16. The heat sealed pieces of material are then stacked on a wheeled pallet 38 which is detachably attached to the apparatus by locking members 40, 41. V-shaped device 42 having a central elongate slot 44 moves back and forth to accurately stack the material on pallet 38.

After two elongate pieces of material have been heat sealed together as described above and stacked on pallet 38, the pallet is detached from the outfeed end of apparatus 10 and moved to the infeed end and attached thereto as illustrated in phantom at 46. This material is then dispensed onto working bed 16 by rollers 48 for attachment of a third elongate piece of material thereto. Successive pieces of elongate material are added by repeating the process until the desired width of the swimming pool cover has been achieved.

Figures 2, 4, 5:
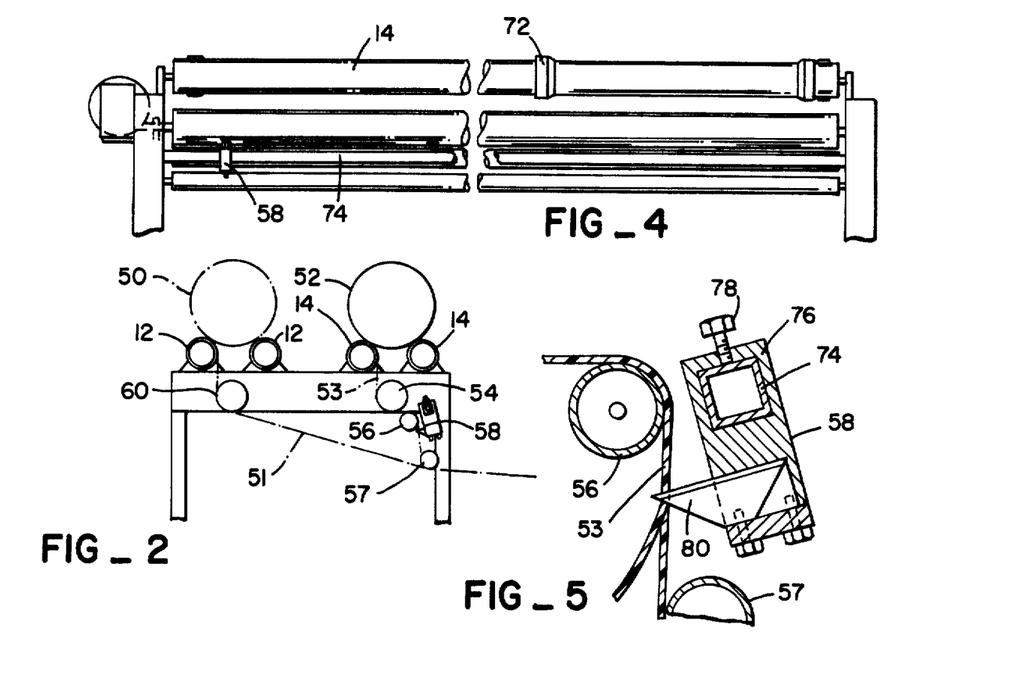
FIG. 2 is a side elevation view of the upper portion of the dispensing apparatus of the present invention.
FIG. 4 is a front elevation view of the apparatus illustrated in FIGS. 2 and 3.
FIG. 5 is a fragmentary elevation view of the cutting apparatus of the present invention.
Figure 3:
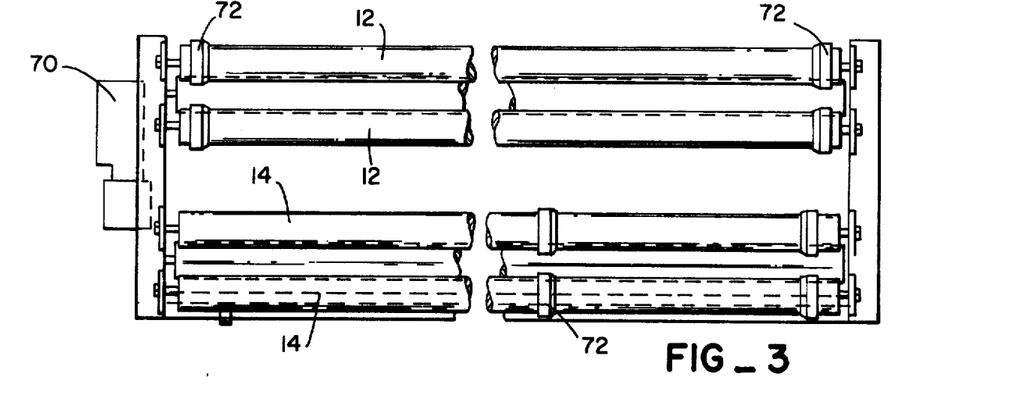
FIG. 3 is a plan view of the apparatus illustrated in FIG. 2.

The support structure for pairs of rollers 12, 14 used to dispense the two pieces of elongate material is illustrated in more detail by way of reference to FIGS. 2-4. During the first pass before any pieces of material have been heat sealed together, a roll 50 of such material is placed on rollers 12 to provide a first piece of such material 51 and another roll 52 of such material is placed on rollers 14 to provide a second piece 53. The material 53 from roll 52 passes over a first idler roller 54 and then a pair of idler rollers 56, 57 before it passes onto the bed. A cutting mechanism 58 is provided intermediate idler rollers 56, 57 and can be used if desired to cut the material 53 dispensed from roll 52 into the desired width, as will be illustrated in more detail hereinafter. The material 51 from roll 50 passes over idler roller 60 and thereafter underneath idler roller 57 so that the first piece of material underlies second piece 53.

The configuration of the pairs of rollers 12 and 14 is also illustrated in the plan and elevation views of FIGS. 3 and 4. The rollers are driven by a motor 70 which drives one each of the pairs of rollers 12 and 14. Collars such as 72 are located on the rollers, and can be positioned therealong to accommodate different widths of material. As illustrated in FIGS. 3 and 4, collars 72 are set on rollers 14 to accommodate a relatively narrow piece of material while a full width piece is to be dispensed from rollers 12. Collars 72 are ordinarily used when a border is to be fixed to the swimming pool cover.

The cutting mechanism 58 is more accurately illustrated by way of reference to FIGS. 4 and 5, in combination. A rectangular bar 74 runs the width of rollers 14 and is located directly below the leading such roller. Cutting mechanism 58 includes a casing 76 adapted to slide along rectangular bar 74, and a set screw 78 for locking the position of casing 76. A blade 80 extends from casing 76 between the pair of idler rollers 56, 57 to cut the second piece of material 52 into the desired width.

Figure 9:
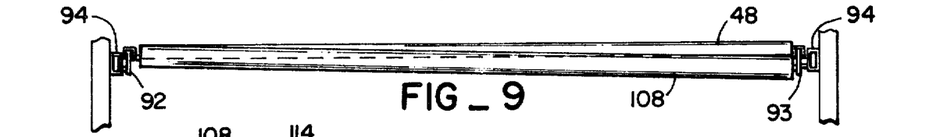
FIG. 9 is a rear elevation view of the apparatus of FIG. 8.
Figure 10:
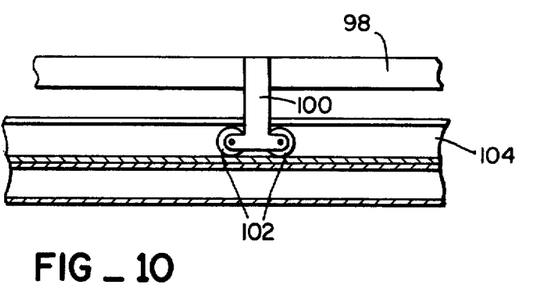
FIG. 10 is a cross sectional plan view of the track assembly of the apparatus of FIGS. 6-9.
Figure 11:
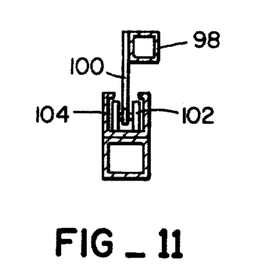
FIG. 11 is a side cross sectional view of the track assembly of FIG. 10.

As discussed hereinabove, after two elongate pieces of material have been joined together, the joined pieces of material are recycled through the apparatus for addition of a third piece of elongate material, and the process is repeated until the entire swimming pool cover is formed. Handling the partially completed pool cover and feeding it onto the working bed is difficult because of the weight and bulkiness of the material. The rollers 48 used in the present invention to handle such material are accordingly designed to mechanically position the material as illustrated in more detail by way of reference to FIGS. 6-9. A pair of frame members 90, 91 are provided, each having one end 92, 93 pivotably connected to support structure 94. The free ends 96, 97 of frame members 90, 91 are connected to a cross member 98 so that the free ends move in concert. As illustrated in FIGS. 10 and 11, cross member 98 is attached to a bracket 100 having wheels 102. Wheels 102 ride within a channel member 104 to allow for transverse movement of cross member 98.

Figure 6:
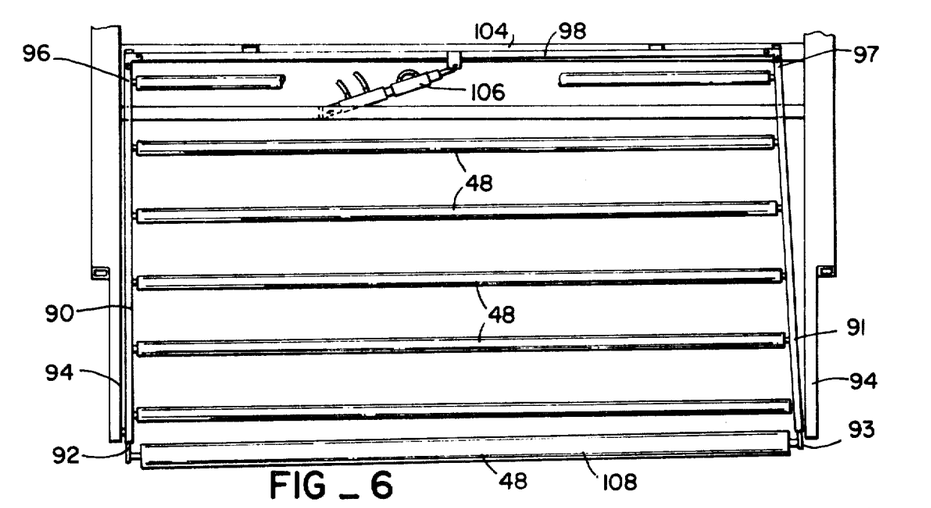
FIG. 6 is a plan view of the lower portion of the dispensing apparatus of the present invention used for dispensing the partially completed pool cover.
Figure 8:
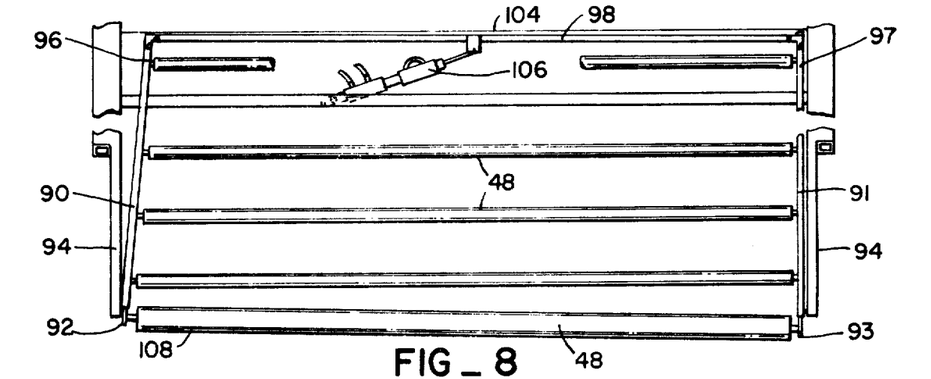
FIG. 8 is a plan view similar to that of FIG. 6 illustrating diversion of the partially completed pool cover to the right.

A hydraulic cylinder 106 is connected to cross member 98, as illustrated in FIGS. 6 and 8. Hydraulic cylinder 106 is actuated to move cross member 98 transversely to move the free ends 96, 97 of frame members 90, 91 in concert. In this manner, the material dispensed over rollers 48 is deflected to one side or the other as it passes onto the working bed (See FIG. 1). FIG. 6 illustrates diversion of the material relatively to the left, and FIG. 8 shows diversion of it to the right. The actuation of cylinders 106 is controlled as hereinafter illustrated to change the direction of feed of the partially completed pool cover to align the pool cover on the working bed.

Figure 7:
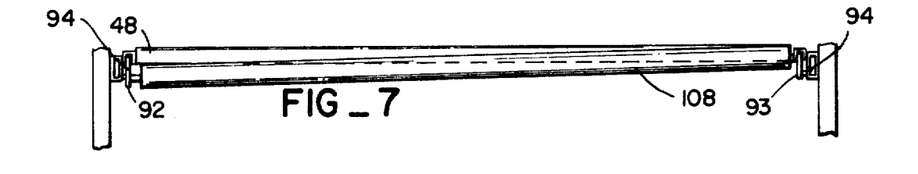
FIG. 7 is a rear elevation view of the apparatus of FIG. 6.
Figures 12, 13:
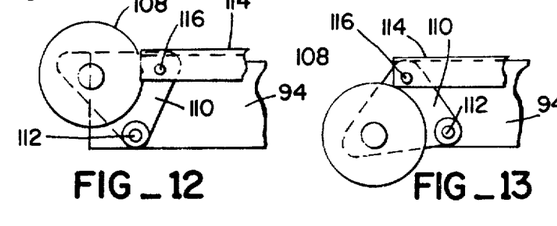
FIG. 12 is an elevation view of the bracket used to mount one of the rollers of the present invention.
FIG. 13 is a view similar to that of FIG. 12 illustrating one end of the roller in the depressed position.
Figure 14:
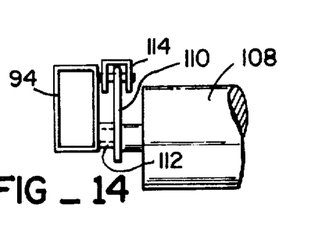
FIG. 14 is a rear elevation view of the apparatus of FIGS. 12 and 13.

As the direction of feed of rollers 48 is altered as discussed hereinabove, a wrinkle tends to form in the material at the trailing end of the rollers. In order to avoid the formation of such a wrinkle, a trailing roller 108 is located at the trailing end of set of rollers 48. The ends of roller 108 are connected to brackets such as 110 illustrated in FIGS. 12, 13 and 14. Brackets 110 are pivotably connected to support structure 94 at 112, and are connected to a strut 114 at 116. When the material is to be diverted to the left as illustrated in FIG. 6, the left end of roller 108 is depressed as illustrated in FIG. 7 to avoid the wrinkle which would otherwise form at that location. Correspondingly, when the material is to be diverted to the right as illustrated in FIG. 8, the right end of roller 108 is depressed as illustrated in FIG. 9. Thus, the tendency of the material to wrinkle as it is diverted is avoided.

Figures 15, 16, 18, 19:
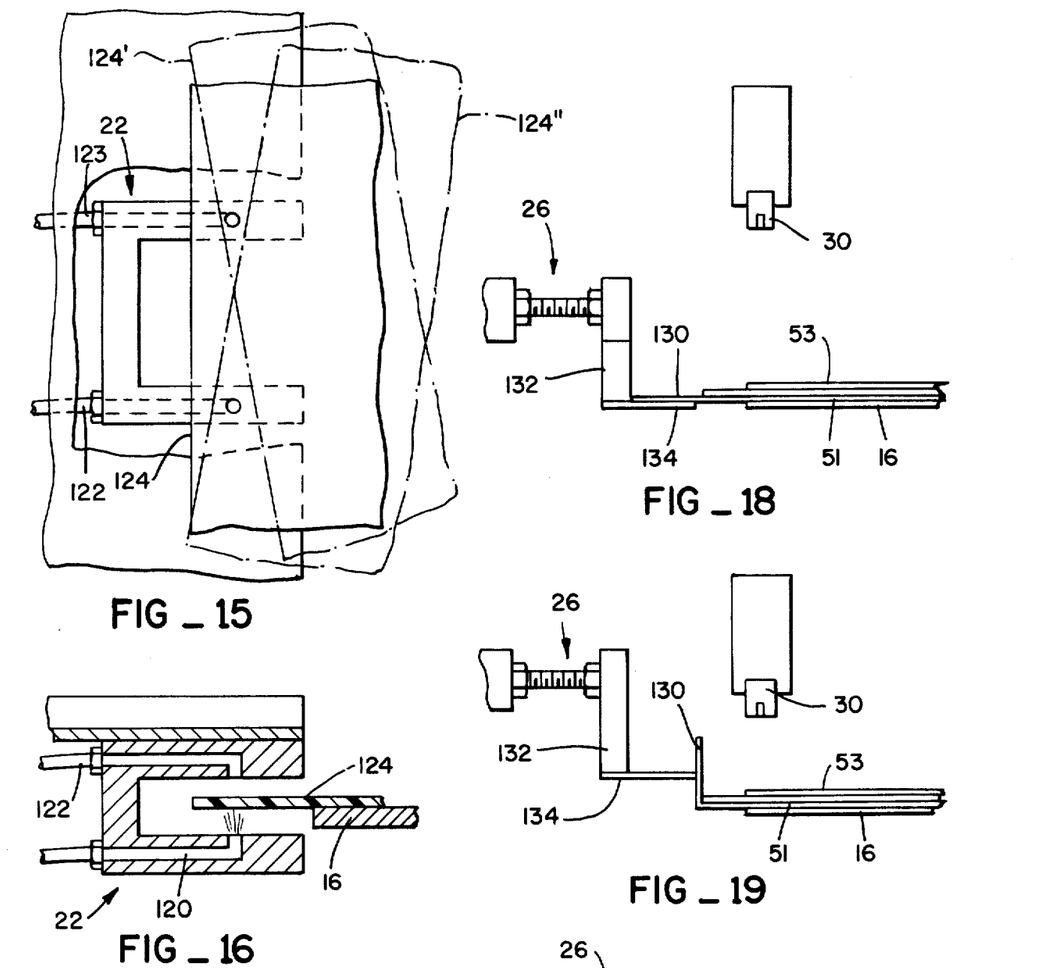
FIG. 15 is a fragmentary plan view of the sensing mechanism of the present invention.
FIG. 16 is a side elevation view of the sensing system illustrated in FIG. 15.
FIG. 18 is a side elevation view of the heat sealing member and folding members of the present invention.
FIG. 19 is a view similar to that of FIG. 18 illustrating partial actuation of the folding member.
Figure 17:
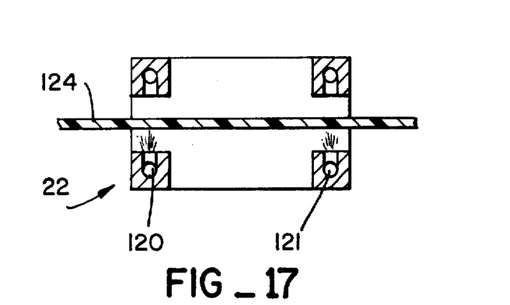
FIG. 17 is a front elevation view of the sensing system illustrated in FIGS. 15 and 16.

The sensing means 22 used to control hydraulic cylinder 106 to thereby control the direction that the partially completed pool cover is dispensed onto the bed is illustrated by way of reference to FIGS. 15, 16 and 17.

Sensing mechanism 22 includes a pair of outlet air lines 120, 121 located in parallel along a lateral edge of working bed 16. A corresponding pair of inlet air lines 122, 123 are juxtaposed to outlet lines 120, 121 so that if the space between them is unoccupied, the air will pass from the outlet line into its corresponding inlet line.

When the partially completed pool cover 124 is moving along working bed 16 so that its lateral edge is parallel to the adjacent lateral edge of the working bed, as desired, it will intersect the air flow from both outlet air lines 120, 121 and the position of hydraulic actuator 106 will not be affected. However, if the direction at which the partially completed pool cover 124 is being fed becomes misaligned with the lateral edge of working bed 16, as illustrated in phantom at 124', 124" in FIG. 15, air flow will result between one of the outlet lines 120, 121 and its corresponding inlet line. As a result, hydraulic actuator 106 will be activated to change the direction of feed of the partially completed pool cover until it is realigned on working bed 16. In this manner, the alignment of the partially completed pool cover can be handled mechanically and manual labor is not required to move the bulky item into alignment.

Figure 20:
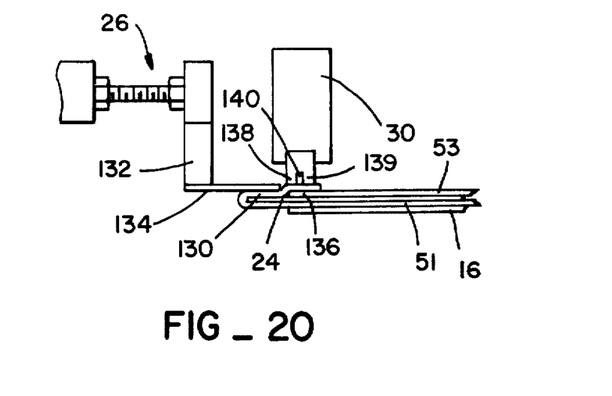
FIG. 20 is a view similar to that of FIGS. 18 and 19 showing complete actuation of the folding member.

As discussed above, as the first and second pieces 51, 53 of material are dispensed over working bed 16, a marginal portion 130 of the first piece of material is exposed, as illustrated in FIG. 18. Folding apparatus 26 includes an L-shaped member 132 having a substantially horizontal flange 134 underlying the exposed marginal portion 130 of the first piece of material 51. When pieces of material 51, 53 are in position underlying heat sealing member 30, L-shaped member 132 initially moves upwardly so that the exposed marginal portion 130 of piece 51 is folded around the edge of intervening plate 24 through a 90° angle, as illustrated in FIG. 19. After moving upwardly as illustrated in FIG. 19, L-shaped member 132 translates laterally and downwardly as illustrated in FIG. 20 so that the lower flange 134 thereof folds the exposed marginal portion 130 of piece 51 completely around the lateral edge of plate 24 to overlie a corresponding marginal portion 136 of piece 53. The total movement of L-shaped member 132 describes a semicircle. L-shaped member 132 maintains the exposed marginal portion 130 of piece 51 in its folded configuration as heat sealing member 30 contacts the corresponding marginal portions and heat seals them together.

As is evident from viewing FIG. 20, heat sealing member 30 has two depending portions 138, 139 separated by an intervening portion 140. Intervening portion 140 is heat insulative whereas depending portions 138 and 139 are heat conductors so that pieces 51, 53 of heat sealable material are heat sealed together in two spaced apart locations. This dual connection is much stronger than a single seam would be, and eliminates the excess compression of the material which results if a single large sea is attempted.

Figure 21:
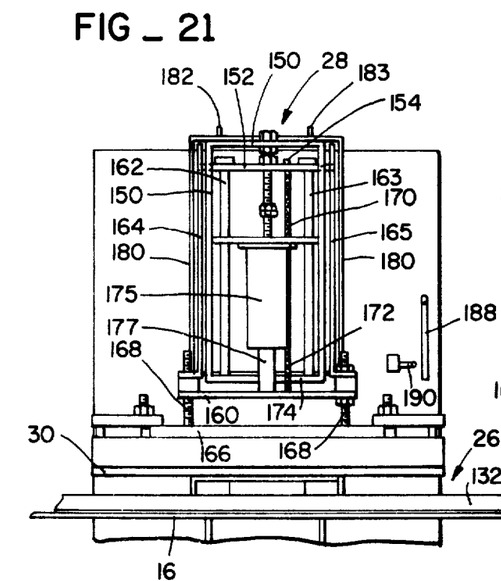
FIG. 21 is a front elevation view of the heat sealing and folding apparatus of the present invention prior to actuation thereof.
Figure 22:
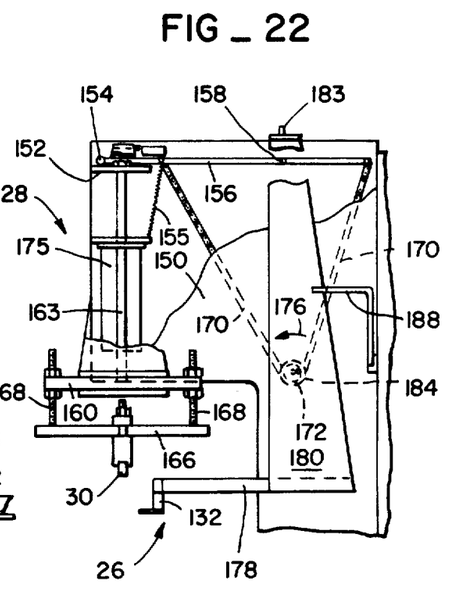
FIG. 22 is a side elevation view of the apparatus of FIG. 21.

The operation of the heat sealing apparatus 28 in conjunction with the folding apparatus 26 is more fully illustrated by way of reference to FIGS. 21-24. In FIGS. 21 and 22, heat sealing member 30 is illustrated in the raised position relatively above working bed 16. Heat sealing apparatus 28 includes a basic support frame 150 which is stationary. An upper platform 152 is movable vertically within support frame 150, and depends from the spring 155 near the forward end of a bar 156. Bar 156 is pivotably mounted to support structure 150 at 158, and has a roller 154 at its forward end which rides along the upper surface of upper platform 152.

An intermediate platform 160 depends from upper platform 152 by means of support columns 162, 163 which bear the weight of intermediate platform 160 and apparatus appended thereto. Members 164, 165 further interconnect upper platform 152 with intermediate platform 160 for added support. A lower platform 166 is suspended from intermediate platform 160 by means of intervening bolts 168. Bolts 168 are adjustable to allow for selected positioning of lower member 166. The heat sealing member 30 is mounted on the underside of lower platform 166 relatively above working bed 16.

Vertical movement of heat sealing member 30 is controlled by pivoting of bar 56 about pivot point 158. A chain 170 is connected to the opposite ends of bar 156 and partially circumscribes sprocket 172 on shaft 174. When shaft 174 is rotated counterclockwise as illustrated by arrow 176, as will be illustrated hereinafter, the forward end of bar 156 will move downwardly so that roller 154 forces upper platform 152 downwardly. Lower platform 166 is rigidly connected to upper platform 15, resulting in corresponding downward movement of heat sealing member 30. Alignment of platform 166 containing heat sealing member is maintained by cylinder 177, attached to support frame 150, which circumscribes shaft 177 attached to intermediate platform 160.

Figure 25:
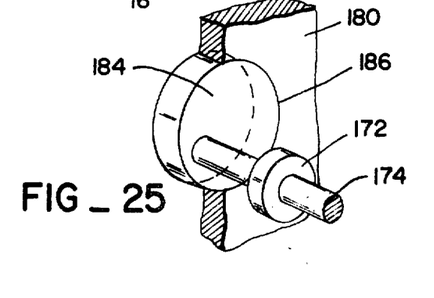
FIG. 25 is a fragmentary perspective view of the cam assembly of the present invention prior to actuation.
Figure 26:
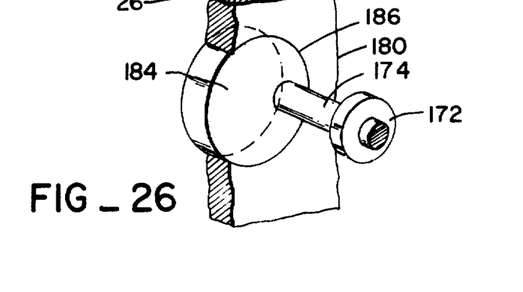
FIG. 26 is a fragmentary perspective view similar to that of FIG. 25 showing actuation of the cam assembly.

Folding apparatus 26 includes an L-shaped member 132 mounted at the free ends of beams 178. Beams 178 are attached to the lower end of frame members 180 located on each side of support structure 150. Frame members 180 are attached to heat sealing apparatus 28 by means of pivot pins 182, 183 which are slotted so that frame members 180 are free to pivot and translate vertically to a limited extent with respect to the heat sealing apparatus. Eccentric circular cams 184 project through corresponding circular apertures 186 in each frame member 180, as illustrated in more detail in FIGS. 25 and 26. Cam 184 is located on the end of shaft 174 which also includes sprocket 172.

Figure 23:
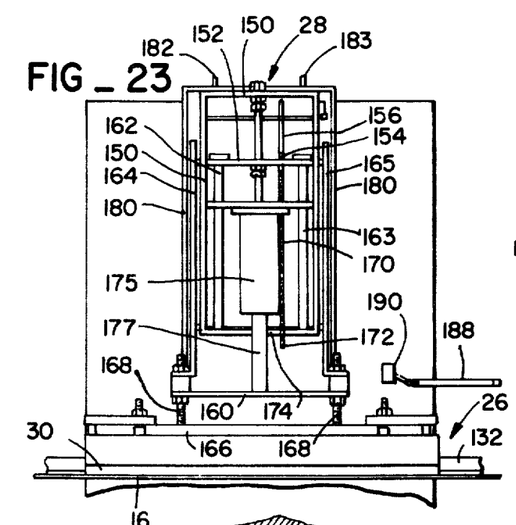
FIG. 23 is a front elevation view of the heat sealing and folding apparatus of the present invention in its actuated configuration.
Figure 24:
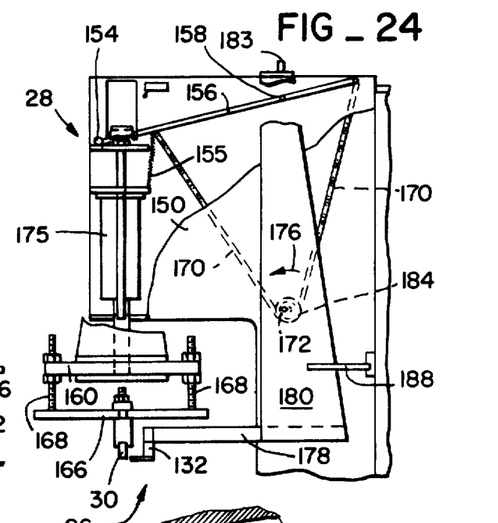
FIG. 24 is a side elevation view of the apparatus of FIG. 23.

When two pieces of material are located on working bed 16 underlying heat sealing member 30 for heat sealing of the pieces together, heat sealing apparatus 28 and folding apparatus 26 act together as illustrated in FIGS. 23 and 24 to join the pieces of material together. First, safety rail 188 is lowered into position so that laborers cannot get too near the machine. Then, switch 190 is depressed which acts to rotate shaft 174 180° as illustrated by arrow 176. As shaft 174 rotates, chain 170 is drawn around sprocket 172 to depress the forward end 154 of bar 156, thereby lowering heat sealing member 30 over the working bed. Simultaneously, frame members 180 will be moved in a semicircular motion about pivot pins 182, 183 to fold the exposed marginal portion of the first piece of material over a corresponding marginal portion of the second piece as illustrated in FIGS. 18 - 20. As a result, the two pieces of material are folded and heat sealed together along a portion of their lengths in a single discrete step. Shaft 174 then rotated back trhough a 180° arc to return heat sealing apparatus 28 and folding apparatus 26 to their original positions.

Figures 27A, 27B, 27C, 27D, 27E, 28:
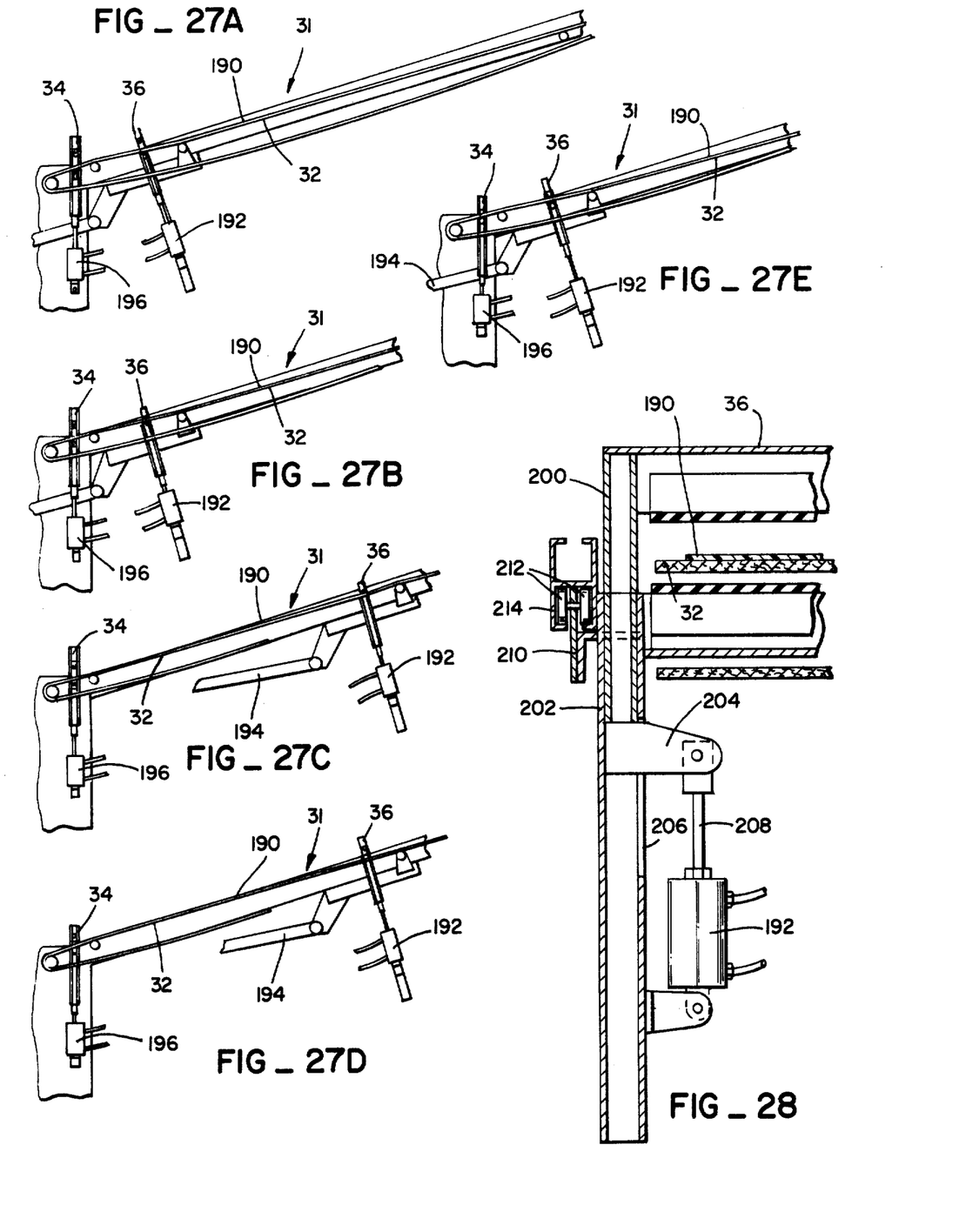
FIGS. 27A-E is a sequence of side elevation views illustrating the operation of the outfeed system of the present invention.
FIG. 28 is a fragmentary elevation and partial section view of the movable clamping member of the present invention.

The operation of outfeed apparatus 31 is illustrated in more detail by way of reference to the sequential views of FIGS. 27A-E. As discussed above, a pair of clamping members 34, 36 overlie inclined conveyor 32. The folded and heat sealed piece of material 190 is adapted to ride over conveyor 32 beneath clamping members 34, 36. Initially, both clamps 34, 36 are in the raised position as illustrated in FIG. 27A. However, when material 190 is to be moved along conveyor 32 after a length of it has been heat sealed together, clamping member 36 is actuated downwardly by hydraulic cylinder 192, as will be illustrated in more detail hereinafter, to clamp material 190 in position relative to clamping member 36 as illustrated in FIG. 27B. Clamp 36 is thereafter motivated along conveyor 32 by armature 194 to move material 190 a preselected distance along the conveyor. This preselected distance is generally equal to the length of the heat sealing member.

After material 190 has been moved the preselected distance along conveyor 32, as illustrated in FIG. 27D, clamp 34 is actuated downwardly by hydraulic piston 196 to clamp material 190 in position at its lower end. Clamp 36 is raised by hydraulic actuator 192, and is returned to its initial position by armature 194 as illustrated in FIG. 27E. The outfeed apparatus 31 is then in position to move material 190 along conveyor 32 another preselected increment.

The construction of clamp 36 and its supporting apparatus is more fully illustrated by way of reference to FIG. 28. Frame members such as 200 depend from the opposite ends of clamp 36 and fit into a corresponding sleeve 202. A bracket 204 projects through aperture 206 in the side of sleeve 202 and is connected to the lower end of member 200. Bracket 204 is connected to the piston 208 of hydraullic actuator 192 so that clamp member 36 can be moved vertically by the hydraulic actuator to clamp material 190 to conveyor 32. Sleeve 202 is mounted to a bracket 210 having wheels 212 which ride in channel 214. Thus, bracket 36 and its supporting apparatus can be moved along conveyor 32 as illustrated in FIGS. 27A-E.

In operation, two rolls of material 50, 52 are placed on pairs of rollers 12, 14 for dispensing of first and second pieces of material 51, 53 onto working bed 16. Spare rolls of material can be located on supply rollers 18, 20 for use when needed. First and second pieces of material 51, 53 are dispensed onto working bed 16 so that a marginal portion 130 of piece 51 is exposed, and plate 24 intervenes between the two pieces of material.

When first and second pieces 51, 53 of material are in position beneath heat sealing member 30, switch 190 is activated to actuate shaft 174 which operates both folding apparatus 26 and heat sealing apparatus 28, thus sealing a length of the two pieces of material together and leaving them in a folded configuration. The two pieces of material heat sealed together form a part of a swimming pool cover or similar article. This part of the swimming pool cover is drawn from working bed 16 by outfeed apparaus 31 in increments equal to the length of heat sealing member 30, and is folded and stacked by V-shaped member 42 on wheeled pallet 38.

After the desired lengths of first and second pieces of material 51, 53 have been heat sealed together and stacked on pallet 38, the pallet is detached from the apparatus by unlocking locking members 40, 41 and rolled into position at the infeed end of the apparatus. This part of the swimming pool cover is fed onto working bed 16 by rollers 48. An additional piece of material is fed onto working bed 16 by rollers 14 so that this new piece of material overlies the part of the swimming pool cover already formed and exposes a marginal portion thereof. The position of the part of the swimming pool cover on working bed 16 is aligned by sensing apparatus 22. The additional elongate piece of material is then heat sealed to the already existing part of the swimming pool cover as described above to further add to the cover. This process is repeated until a swimming pool cover or similar article having the desired transverse dimensions is formed.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What I claim as new is:

1. Apparatus for heat sealing first and second elongate pieces of material together, said apparatus comprising:
    a working bed;
    means for dispensing the first and second elongate pieces of material onto the working bed so that the second piece overlies the first piece with a marginal portion of the first piece being exposed;
    means for folding the exposed marginal portion of said first piece of material over a corresponding marginal portion of said second piece of material;
    means for heat sealing said material portions of the first and second pieces of material together; and
    means for accumulating the heat sealed material, including means for transferring the accumulated heat sealed material to the dispensing means for dispensing said heat sealed material onto the working bed with the latter said means for joining said heat sealed material to another piece of elongate material so that an article can be formed having relatively large transverse dimensions from a plurality of such elongate pieces of material.

2. Apparatus as recited in claim 1 wherein the heat sealing means comprises an elongate heat sealing member normally disposed over the working bed, and means for motivating the heat sealing member downwardly over the marginal portions of the first and second pieces of material.

3. Apparatus as recited in claim 1 wherein the folding means comprises a folding member having an elongate flange parallel to the first and second pieces of material and adapted to normally underlie the exposed marginal portion of the first piece of material, and means for motivating the folding member so that the elongate flange thereof moves first upwardly and then partially over the marginal portion of the second piece of material to fold the exposed marginal portion of the first piece of material over the marginal portion of the second piece of material and maintain said marginal portion of said first piece of material in its folded configuration.

4. Apparatus for joining a plurality of elongate pieces of heat sealable material together, said apparatus comprising:
    a working bed and a plate overlying said bed;
    means for dispensing a first piece of heat sealable material onto the bed under said plate;
    means for dispensing a second piece of heat sealable material onto the bed overlying said plate so that one lateral edge of the second piece of material is spaced inwardly from a corresponding edge of the first piece of material to expose a marginal portion of said first piece of material;
    means for folding the exposed marginal portion of said first piece of material around said plate and over a corresponding marginal portion of said second piece of material;
    means for heat sealing said marginal portions of the first and second pieces of material;
    means for advancing said heat sealed material; and
    means for accumulating the heat sealed material
    means for transferring the accumulated heat sealed material to the first piece dispensing means for dispensing said heat sealed material onto the bed with the latter said means for joining said heat sealed material with another piece so that an article can be formed having relatively large transverse dimensions from a plurality of such elongate pieces of material.

5. Apparatus as recited in claim 4 wherein the heat sealing means comprises an elongate heat sealing member normally disposed over the bed, and means for motivating the heat sealing member downwardly over the folded marginal portions of the first and second pieces of material; and wherein the outfeed means includes means for drawing the heat-sealed material from the bed in increments generally equal to the length of the heat sealing member.

6. Apparatus as recited in claim 4 wherein said transferring means comprises a wheeled pallet, means for detachably attaching the wheeled pallet adjacent the outfeed means so that the heat-sealed material is stacked on said wheeled pallet, and means for detachably attaching the wheeled pallet adjacent the first piece dispensing means so that the heat-sealed material can be stacked on the pallet, and the pallet then wheeled into position adjacent the first piece dispensing means for dispensing said heat-sealed material with the latter said means.

7. Apparatus as recited in claim 4 wherein the folding means comprises a folding member having an elongate flange parallel to the first and second pieces of material and adapted to normally underlie the exposed marginal portion of the first piece of material, and means for motivating the folding member so that the elongate flange thereof moves first upwardly and then partially over the marginal portion of the second piece of material to fold the exposed marginal portion of the first piece of material over the marginal portion of the second piece of material and maintain said marginal portion of the first piece of material in its folded configuration.

8. Apparatus for forming a lap seam between two elongate pieces of material capable of being heat sealed together, said apparatus comprising:
    a bed having at least one elongate lateral edge and a plate overlying said bed;
    an elongate heat sealing sealing member normally disposed over the bed adjacent the lateral edge and parallel thereto;
    means for dispensing a first of the elongate pieces of material onto the bed under the plate so that one lateral edge of said material is adjacent the lateral edge of the bed;
    means for dispensing the second, other elongate piece of material onto the bed overlying the plate so that one lateral edge of the second piece of material is spaced inwardly from said one lateral edge of the fist piece to expose a marginal portion of the first piece of material, said first and second dispensing means being located at one end of the bed;
    out feed means at the other end of the bed adapted to draw the first and second pieces from said bed after heat sealing thereof in increments generally equal to the length of the sealing member, said out feed means including an inclined conveyor, a first clamping member located at the lower end of said conveyor, and a second clamping member movable along said conveyor, said first clamping member and said second clamping member being operative in combination to draw the pieces of material off the bed after the pieces have been sealed together;

means for folding the exposed marginal portion of the first piece around the plate and over a corresponding marginal portion of the second piece, wherein said folding means describes a semi-circular path; and means for motivating the heat sealing member downwardly over the folded marginal portion of the first piece and the corresponding marginal portion of the second piece to heat seal said marginal portions together.

9. Apparatus as recited in claim 8, wherein the folding means comprises an L-shaped member and means for motivating said L-shaped member so that the lower flange of the L-shaped member initially underlies the exposed marginal portion of the first piece of material and the vertical flange of the L-shaped member confronts the lateral edge of the exposed marginal portion, then folds said exposed marginal portion over the corresponding marginal portion of the second piece and overlies a portion of said marginal portions as the heat sealing member is motivated downwardly to maintain said marginal portions in their folded configuration, said L-shaped member describing a semi-circular path.

10. Apparatus for forming a lap seam between two elongate pieces of material capable of being heat sealed together, said apparatus comprising:

a bed having at least one elongate lateral edge and a plate overlying said bed;

an elongate heat sealing member normally disposed over the bed adjacent the lateral edge and parallel thereto;

means for dispensing a first of the elongate pieces of material onto the bed under the plate so that one lateral edge of said material is adjacent the lateral edge of the bed;

means for dispensing the second, other elongate piece of material onto the bed overlying the plate so that one lateral edge of the second piece of material is spaced inwardly from said one lateral edge of the first piece to expose marginal portion of the first piece of material;

means for folding the exposed marginal portion of the first piece around the plate and over a corresponding marginal portion of the second piece, wherein said folding means comprises an L-shaped member;

means for motivating the heat sealing member downwardly over the folded marginal portion of the first piece and the corresponding marginal portion of the second piece to heat seal said marginal portions together; and cam means for motivating the L-shaped member and the heat sealing member in sequence including a support structure pivotally mounted on each side of said support structure supporting said L-shaped member and including circular apertures therein, a shaft extending between frame members, circular cams rotatably mounted in said circular apertures and mounted at each end of said shaft, said shaft being on an eccentric axis of said circular cams, a sprocket mounted on said shaft, a chain coupling said sprocket and said heat sealing member, said heat sealing member being movable in a substantially vertical plane relative to said support structure, and means for rotating said shaft through a 180° arc for moving said frame members motivating said L-shaped member in a semi-circular arc and said heat sealing member in a vertical plane.

* * * * *